United States Patent [19]
Baldwin et al.

[11] Patent Number: 5,237,826
[45] Date of Patent: Aug. 24, 1993

[54] CONFIGURATION WIRING HARNESS FOR HVAC CONTROLLER

[75] Inventors: Joe M. Baldwin; Richard A. Bishop, both of Clarksville; James A. Davis, Franklin, all of Tenn.; Merle A. Renaud, Onalaska, Wis.

[73] Assignee: American Standard Inc., New York, N.Y.

[21] Appl. No.: 556,770

[22] Filed: Jul. 23, 1990

[51] Int. Cl.⁵ ............................................. F25D 29/00
[52] U.S. Cl. ......................................... 62/77; 62/125; 62/298; 174/72 A
[58] Field of Search .................... 62/125, 126, 127, 77, 62/298, 181, 183, 184; 364/191, 192; 174/72 A; 340/533, 537

[56] References Cited
U.S. PATENT DOCUMENTS 3,138,941  6/1964  Jensen ................................. 62/184
3,842,496 10/1974  Mercer ............................. 174/72 A
4,545,210 10/1985  Lord ..................................... 62/77

Primary Examiner—Harry B. Tanner
Attorney, Agent, or Firm—William J. Beres; William O'Driscoll; Peter D. Ferguson

[57] ABSTRACT

A method of configuring a controller of an HVAC system comprising the step of configuring the HVAC system based upon components which are indicated by a wiring harness to be physically connected to the HVAC system.

16 Claims, 3 Drawing Sheets

CONFIGURATION WIRING HARNESS FOR HVAC CONTROLLER

BACKGROUND OF THE INVENTION

The present invention is directed to a wiring harness for a heating, ventilating and air conditioning (HVAC) system and, more particularly, to a method and apparatus for accurately and automatically, configuring the controller of the HVAC system to recognize the system configuration.

Large scale HVAC systems are tailored to the owner's specific needs and requirements. An HVAC system will typically include one or more compressors, one or more condensers, one or more evaporators, and one or more condenser fans, all of which are controlled by a controller. The HVAC system can also include an economizer, a heat pump, a building automation system, and a heating system. The controller is generally provided to monitor and control the operation of the system as configured by the owner of the HVAC system. To function properly, the controller must be accurately programmed to recognize the configuration of the system. If the controller is not capable of being programmed, field service personnel are required to stock multiple versions of the controller, one version for each HVAC system configuration.

Many problems which are found in prior systems result from human error in programming or identifying the initial HVAC system configuration to the controller. This initial configuration problem occurs both in the installation of new systems, and in the repair or upgrading or existing systems.

Prior systems have taken two approaches to solving this problem.

Firstly, prior systems have relied on centralized configuration jumpers and DIP switches to inform the controller of the system's configuration. Configuration jumpers are a series of paired input terminals which are individually connected or disconnected by an installer to inform the controller of the presence or absence of particular system elements or functions. Similarly, a DIP (dual in-line package) switch is a bank of small switches adapted for easy insertion into a printed circuit board. The individual switches of the DIP switch are opened or closed by an installer to provide an input to the controller representative of the presence or absence of particular system functions or elements. However, configuration jumpers and DIP switches are expensive, and require the design of the controller to include a centralized, external location. This centralized location is costly both in terms of design and in terms of material. Also, both configuration jumpers and DIP switches are subject to installer error during the initial system configuration, and both are subject to accidental alternation once the system has been established. Additionally, DIP switches have been known to be install backwards, leading to additional errors.

For example, U.S. Pat. No. 4,545,210 to Lord shows an electronic program control including programmable headers with fixed jumpers which develop to binary code to configure a microprocessor to the physical characteristics of an assembled refrigeration unit. The programmable header is programmed at the factory by selectively breaking the jumpers to develop the binary code. Programming of the microprocessor for accessory equipment is performed by field service personnel using small dip switches to develop a binary code for the microprocessor. Both the dip switches and the selectively broken jumpers of the programmable header are subject to considerably human error in determining the physical characteristics of the assembled refrigeration unit and the accessory equipment. Additionally, programmable headers require considerable design effort in laying out the configuration of the controller, to ensure that there exists a single location containing all of the connections to the programmable header, and all of the connections to the dip switches. Furthermore in addition to the cost and limitations of such a design effort, the cost of the programmable headers, the fixed jumpers, the connections, and the dip switches can add considerable expense to a controller.

Secondly, some prior systems take the approach of modifying a standard wiring harness during assembly to match the requirements of the desired systems. In this approach, wires and connectors are added or removed as necessary during assembly of the controller and the HVAC system. Such an approach is costly in terms of material, is labor intensive, and is very subject to human error. Additionally, such an approach may require considerable rewiring if the controller is replaced or upgraded.

SUMMARY OF THE INVENTION

It is an object of the invention to solve the problems of prior art HVAC systems in initially configuring the system controllers.

It is an object and an advantage of the present invention to eliminate human error in configuring HVAC system controllers.

It is a further object and an advantage of the present invention to provide a configuration wiring harness with an initial system configuration which is not subject to human or accidental error.

It is an object and an advantage of the invention to provide an easily installable configuration wiring harness which is replaceable upon system modification.

It is an object and an advantage of the present invention to provide a pre-programmed configuration wiring harness which is not subject to human error, but which is removable or replaceable to facilitate the reconfiguration of a controller.

It is an object, feature and advantage of the present invention to provide a configuration wiring harness which automatically configures replacement controllers in the field.

It is an object, feature and advantage of the present invention that field service personnel do not need to stock multiple versions of the controller.

The present invention provides a method of configuring a controller of an HVAC system comprising the step of: configuring the HVAC system based upon components which are indicated by a wiring harness to be physically connected to the HVAC system.

The present invention also provides a self configuring controller for an HVAC system including various components including a controller and a wiring harness adapted for connection to the controller and to the components of the HVAC system. The wiring harness includes means for providing an initial HVAC system configuration.

The present invention also provides a controller for an HVAC system including a controller including means to control a plurality of possible components of an HVAC system and a predetermined wiring harness linking the plurality of possible HVAC system components to each other and to the controller. The wiring harness includes a selected system configuration chosen from a plurality of wiring harnesses where each of the plurality of wiring harnesses represents one of a plurality of allowable system configurations.

The present invention further provides a method for configurating the controller of an HVAC system comprising the steps of: selecting a predetermined wiring harness which provides a number of binary inputs indicative of the system configuration; installing the wiring harness; and configuring the system in accordance with the binary inputs indicative of the system configuration.

The present invention further provides an HVAC system comprising: a compressor; an outdoor heat exchanger connected to the outlet of the compressor; an indoor heat exchanger connected to the inlet of the compressor; an expansion device connected between the indoor and the outdoor heat exchangers; and a controller including means to control the operation of the HVAC system; a wiring harness providing operable connections between said controller and the compressor, the indoor heat exchanger and the outdoor heat exchanger. The wiring harness also permanently includes predetermined means for initially configuring the HVAC system.

The present invention further provides a method of manufacturing a wiring harness for an HVAC system comprising the steps of: determining a particular HVAC system configurations; permanently connecting a plurality of electrical connections in a predetermined pattern indicative of the selected system configuration; and securing the electrical connections into a wiring harness.

The present invention further provides a system for programming the controller of a heating, ventilating and air conditioning system so that the controller recognizes which elements of a multiplicity of possible elements are present in the system. The system includes a controller for controlling the heating, ventilating and air conditioning system as well as the individual elements of the system. The controller also includes a plurality of input terminals and a plurality of distinct pre-programmed wiring harnesses. Each distinct pre-programmed wiring harness represents a possible system configuration. Each of the plurality of wiring harnesses has means for engaging the plurality of input terminals and means for providing a selective electrical connection between the input terminals which represent a possible system configuration. The distinct pre-programmed wiring harness representative of the desired system is selected and engaged to the plurality of pairs of input terminals to configure the heating, ventilating and air conditioning system.

The present invention further provides a method of configuring the controller of a heating, ventilating and air conditioning system. The method comprises the steps of determining the various allowable system configurations, forming a plurality of distinct wiring harnesses representative of each of the various allowable system configurations, determining the configuration of a specific refrigeration system, selecting a wiring harness from the plurality of distinct wiring harnesses which is representative of the configuration of the specific refrigeration system, and attaching the selected wiring harness to the controller of the specific refrigeration system.

The present invention further provides a method of configuring the condenser fan continuous and cycling modes of operation and the condenser fan cycling temperature in an HVAC system. The method comprises the step of permanently including the condenser fan continuous and cycling mode configuration inputs with the condenser fan cycling temperature input within a wiring harness of an HVAC system.

Figure 3:
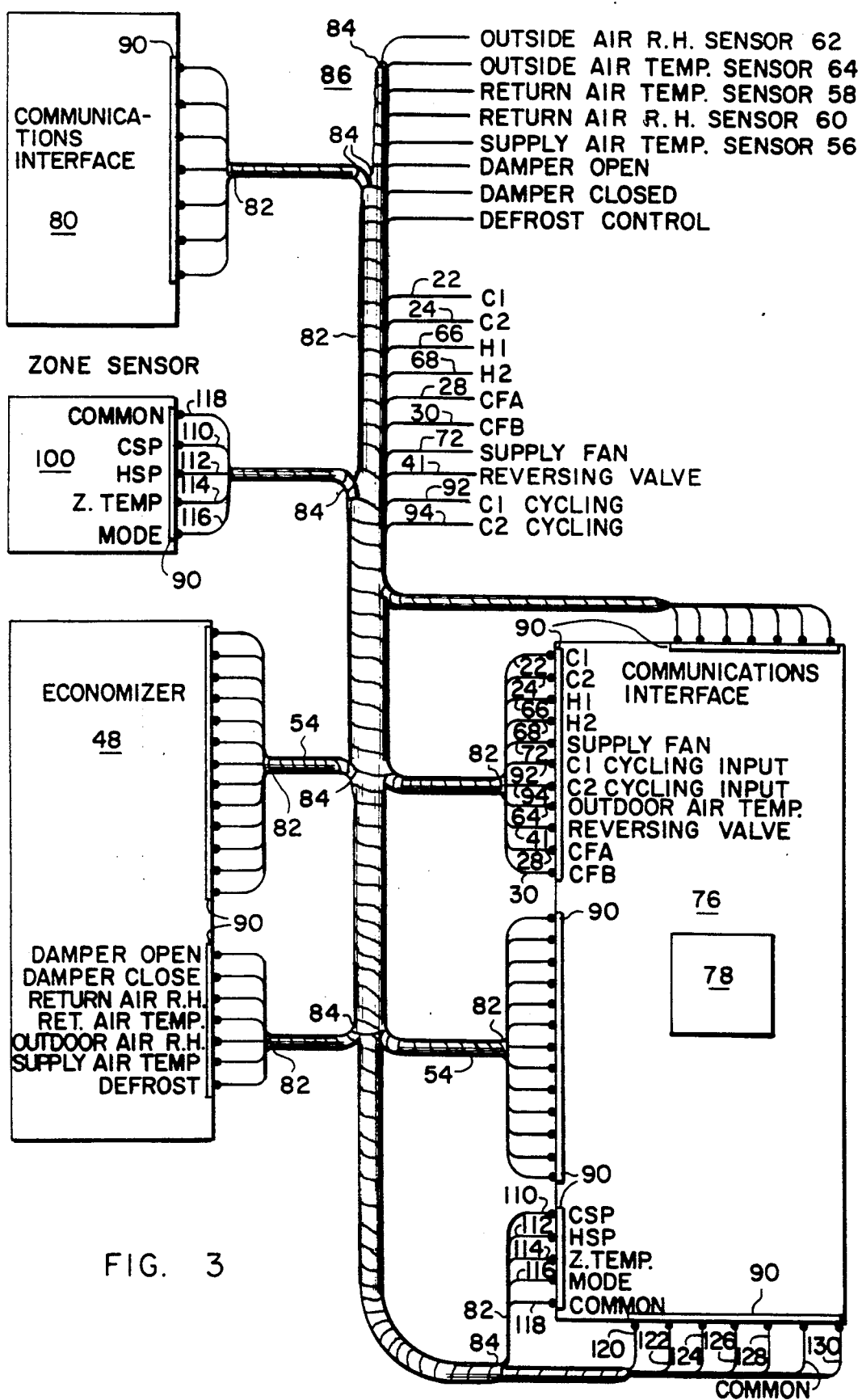
FIG. 3 is a representation of a wiring harness of the present invention for use with the HVAC system and the controller of FIGS. 1 and 2.

Table 1 represents an embodiment of the wiring harness of FIG. 3.

Table 2 represents a further embodiment of the wiring harness of FIG. 3.

DETAILED DESCRIPTION OF THE DRAWINGS

Figure 1:
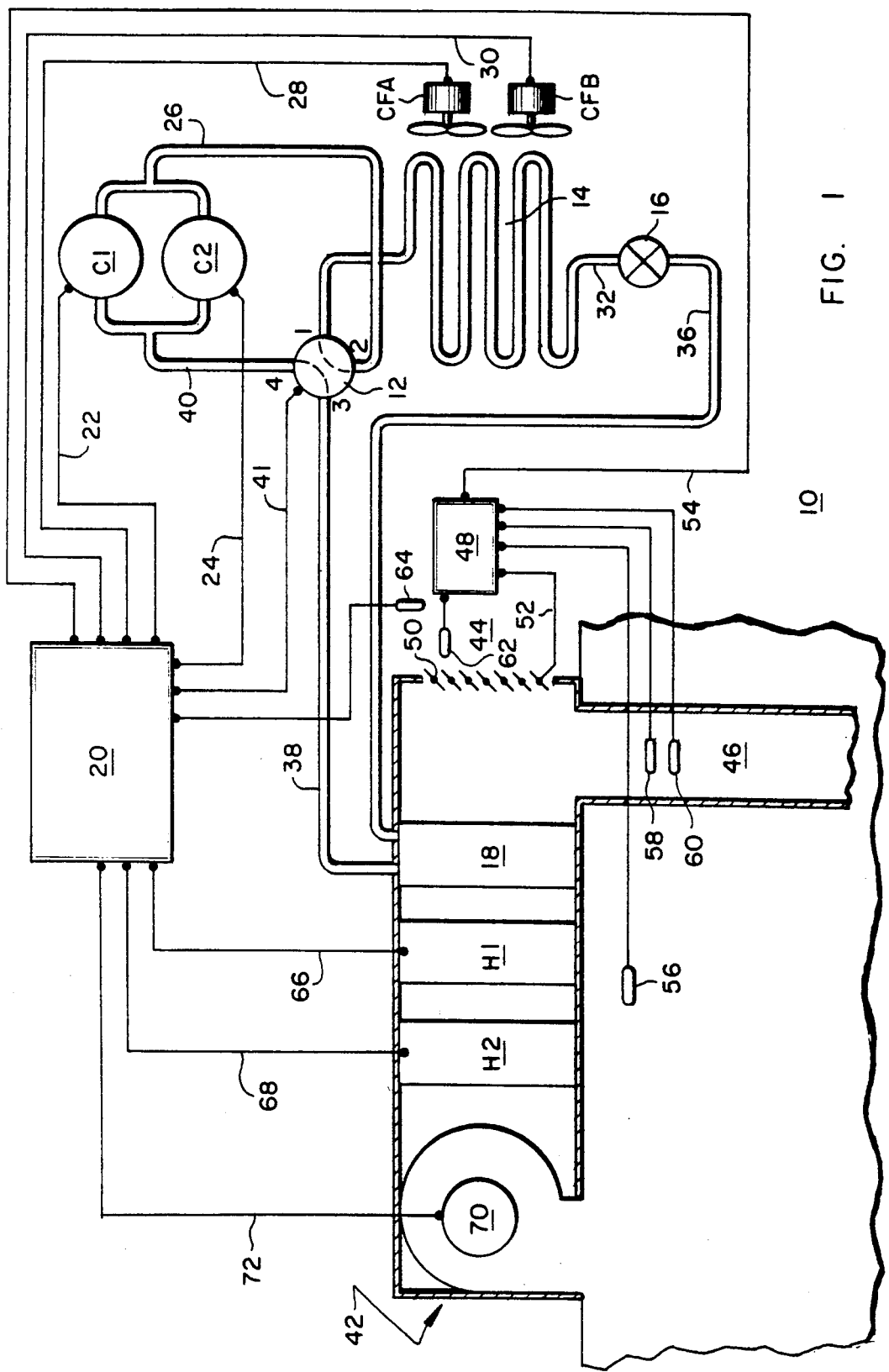
FIG. 1 shows an HVAC system including a controller.
Figure 2:
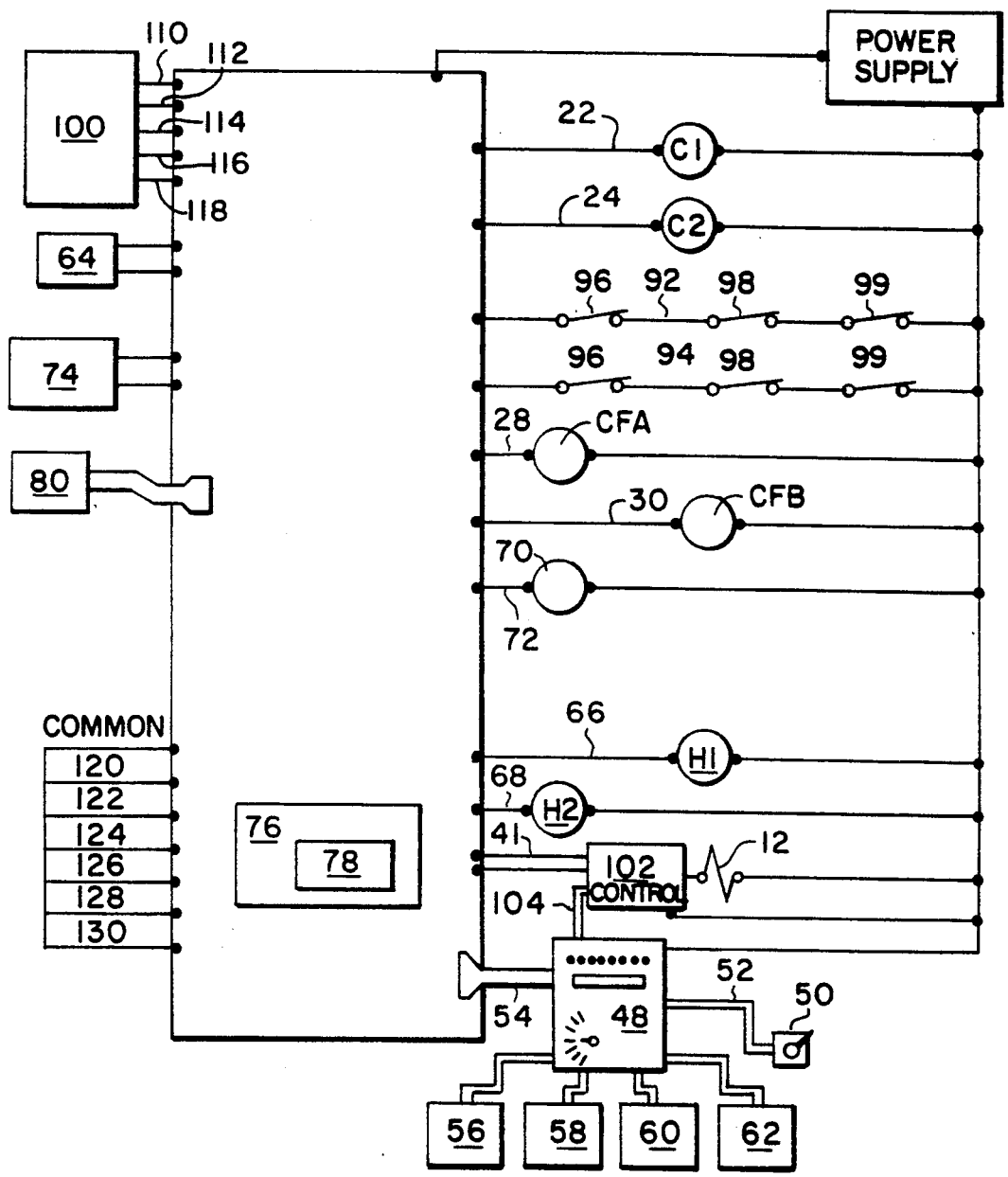
FIG. 2 is a block diagram showing the controller of FIG. 1.

FIGS. 1 and 2 show an HVAC system 10 including a first compressor C1, a second compressor C2, a reversing valve 12, an outdoor heat exchanger 14, an expansion device such as an expansion valve 16, an indoor heat exchanger 18, and a system controller 20. The HVAC system, as shown in FIG. 1, is configured as a heat pump system with two compressors and two stages of auxiliary heat. However, the configuration of the actual HVAC system can vary considerably in the number of compressors and heaters. Additionally, the HVAC system can be configured as a cooling only system.

In FIG. 1 the compressor C1 and C2 are connected in parallel and are selectively energized by the system controller 20 using electrical lines 22 and 24 respectively. A refrigerant line 26 leaving the compressors C1 and C2 is connected through ports 1 and 2 of the reversing valve 12 and a refrigerant line 27 to the outdoor heat exchanger 14 when the reversing valve 12 is in the cooling mode as shown in the configuration of FIG. 1. The outdoor heat exchanger 14 is cooled by two condensing fans CFA and CFB, each of which is independently connected to and controlled by the system controller 20 using electrical lines 28 and 30 respectively. A refrigerant line 32 leaving the outdoor heat exchanger 14 is connected to the expansion valve 16. The expansion valve 16 is connected to the indoor heat exchanger 18 by a refrigerant line 36. A refrigerant line 38 from the indoor heat exchanger 18 is connected through ports 3 and 4 of the reversing valve 12 to the compressors C1 and C2 by means of refrigerant line 40.

In the heating mode the system controller 20 controls the reversing valve 12 by means of an electrical line 41 so that the refrigerant line 26 leaving the compressors C1 and C2 is connected to the refrigerant line 38 and the indoor heat exchanger 18 through ports 2 and 3 of the reversing valve 12. The indoor heat exchanger 18 exchanges heat with the air passing over it, and cooled refrigerant leaves the indoor heat exchanger 18 passing along the refrigerant line 36 to the expansion valve 16. From the expansion valve 16 the refrigerant enters the outdoor heat exchanger 14 by means of the refrigerant line 32 where the refrigerant absorbs heat and vaporizes. The vaporized refrigerant returns to the compressors C1 and C2 through the refrigerant line 27, ports 1 and 4 of the reversing valve and the refrigerant line 40.

The HVAC system 10 also includes an air handling unit 42 having an outside air connection 44 and a return air connection 46. An economizer 48 mixes the outside air and the return air using a damper 50 controlled by means of an electrical line 52. The economizer 48 is connected to the system controller 20 by a multiplexed electrical connection 54 and includes sensors to sense supply air temperature 56, return air temperature 58, return air humidity 60, and outside air humidity 62. Also, the system controlled 20 is connected to an outside air temperature sensor 64. After the outside air and the return air has been mixed by the economizer 48, the mixed air passes over the coils of the indoor heat exchanger 18. The mixed air then passes over a first auxiliary heater H1 and a second auxiliary heater H2, each of which are connected to the system controller by an electrical line 66 and 68 respectively. Finally, a supply fan 70 impels the mixed air into the space to be cooled. The supply air fan 70 is operably connected to the controller 20 by means of an electrical line 72.

The system controller 20 includes a circuit board 76 supporting a microprocessor 78, such as a NEC series 7800, having both read only memory (ROM) and random access memory (RAM). For the sake of simplicity, the connections in FIG. 2 are shown as direct connections. However, most connections are implemented using intermediate contactors.

The controller 20 includes a compressor cycling input line 92 for the compressor C1, and a compressor cycling input line 94 for the compressor C2. Each compressor cycling input line 92, 94 includes a series of "make break" connections which provide an indication to the controller 20 that the respective compressor C1, C2 is presently enabled or disabled. The "make break" connection can include, for example, a switch 96 indicating that the evaporator defrost control is requested, a low pressure cutout switch 98, and a building automation system input 99 indicating that the respective compressor C1, C2 is being scheduled off by a building automation system (not shown).

The controller 20 includes a defrost controller 102 which is connected to the economizer 48 by a connecting line 104 if the economizer 48 is included in the HVAC system 10. The defrost controller is also located on the electrical line 41 between the controller 20 and the reversing valve 12 so that the defrost controller 102 can control the reversing valve 12 when defrosting.

The system controller 20 is an intelligent device which accepts inputs, makes decisions, and issues commands to the various elements of the HVAC system 10. The inputs to the system controller 20 from a zone sensor 100 include a zone temperature input ZTEMP, a cooling setpoint CSP, a heating setpoint HSP, and a mode of operation input MODE for selecting operating modes such as, for example, EMERGENCY HEAT, HEAT, AUTO, COOL or OFF. These inputs are respectively received by the controller 20 on electrical lines 110, 112, 114 and 116 in the form of analog values which the controller 20 then uses in its decision making processes. The controller 20 and the zone sensor 100 are also joined by a common line 118.

Typically the controller 20 has several physically distinct parts including the circuit board 76, the economizer 48, a communication interface 80, as well as the zone sensor 76. Each of these parts includes subcomponents, all of the parts and subcomponents being linked by a plurality of individual wires 82. Each wire 82 is used to provide the necessary connections between the various parts and subcomponents. The plurality of individual wires 82 are then tied or bundled together with fasteners 84 to form a relatively rigid wiring harness 86.

In previous systems a single standard wiring harness was made up for use in all versions of an HVAC system, and then customized to meet the specific needs of various system version designs. For instance, a set of specific modifications would be made to the standard wiring harness if the system was a gas powered system, while an entirely different set of modifications would be made for an electrically powered system. Similarly, further modifications would be made if an economizer was to be present in the system. Considerable human effort was involved in adding and removing the individual wires to the complexity of wires 82 which formed the wiring harness 86. This human effort and complexity often resulted in human error from incorrectly modifying the wiring harness 86. As a result further effort was required to correct the incorrectly modified harness.

In the present invention, a plurality of distinct predetermined wiring harnesses 86 are physically configured to incorporate each of the basic system designs. Referring to the lookup Tables 1 and 2, there are four possible heating configurations contemplated by the preferred embodiment, in addition to two modes of condenser fan operation and seven operating temperatures for use in the condenser fan cycling mode of operation. This presents a finite number of configurations which can be incorporated into a finite number of wiring harnesses. A plurality of distinct wiring harness 86 are formed. Each of the plurality of distinct wiring harnesses 86 is made to be representative of one of the finite allowable system configurations by selectively providing electrical connections between specific input terminals 120, 122, 124, 126, 128, 130. This provides binary inputs in the form of opens or shorts to the controller 20 which are indicative of a specific system configuration. The controller 20 reads these binary inputs at system initialization and configures the HVAC system 10 accordingly.

In other words, a first wiring harness 86 might be produced en mass which provides the wiring connections for a gas powered system with an economizer. A second wiring harness 86 might be produced en mass which provide the wiring connections of a gas powered system without an economizer. A third wiring harness 86 might be produced en mass which provides the wiring connections of an electric powered system with both an economizer, and a communications interface. A person assembling an HVAC system 10 selects a predetermined wiring harness 86 from a bin of similar wiring harnesses, perhaps color coded for ease of identification, and attaches the wiring harness 86 to the controller 20 using inexpensive terminal strips 90 and without the necessity of customized rewiring. Upon system activation, the HVAC system 10 reads the system configuration contained within the wiring harness 86 and controls the HVAC system 10 accordingly. Effectively the human element is removed from this stage of assembly, thereby eliminating the errors inherent in customized modifications of each wiring harness 86.

The advantages of incorporating the system configuration in a plurality of distinct wiring harnesses includes more than just the elimination of human error in customizing the wiring harness 86. The design of the controller 20 is simplified because the components on the circuit board 76 and on the economizer 48 as well as the communications interface 80 need not be arranged in an optimum design or in a design which centralizes the configuration elements. For example, simple wire connection terminal strips 90 can be mounted anywhere on the controller circuit board 76 with little concern about the optimization of the size, placement and cost of the terminal strips 90. Additionally, other advantages in the form of component costs are realized through the elimination of the previous relatively expensive jumpers and dip switches by substituting relatively inexpensive wiring for the jumper connections and the dip switches. Further advantages in inventory control are realized because field service personnel need only stock one type of board.

To implement the present invention as shown in FIG. 3 and Table 1, an embodiment related to the heating configuration includes a pair of wires 120, 122 in the wiring harness 86 to provide a binary input into the controller 20. The binary input depends on whether the wires 120, 122 are shorted or open and is indicative the heating configuration. These wires 120, 122, when read across COMMON, provide four possible states depending upon whether the wires 120, 122 are open or shorted. These four possible states can be correlated in Table 1 to four possible heating system configurations which the controller 20 can use to configure itself.

Referring now to FIG. 3 and Table 2, a further embodiment addresses the configuration of the condenser fan continuous mode, the condenser fan cycling mode of operation, and the condenser fan cycling temperature into the wiring harness 86. The condenser continuous and cycling modes of operation, and condenser fan cycling temperatures are combined and configured in the preferred embodiment using three binary inputs incorporated into the wiring harness 86 in the form of individual wires 124, 126, and 128 to provide the eight possible input states shown in Table 2. The binary inputs depend upon whether each of the wires 124, 126 and 128 are shorted or open in relation to COMMON. In the preferred embodiment of the present invention the binary input states zero through six of Table 2 indicate that the condenser fan cycling mode of operation is desired. A binary input state of seven in FIG. 2 indicates that the continuous condenser fan mode of operation is desired. Furthermore, in the preferred embodiment of the present invention, the binary states zero through six also provide an indication of the desired ambient switching temperature for the condenser fan cycling mode of operation. When the ambient temperature falls below the desired switching temperature, the condenser fan cycling mode of operation is disabled. Specifically, the binary input combination of zero through six respectively indicates desired ambient operating temperatures of 80° F., 70° F., 60° F., 50° F., 40° F., 30° F., and 20° F.

A further embodiment contemplates a single wire 130 incorporated into the wiring harness 86 to provide a binary input indicative of whether an economizer 48 is present in the HVAC system 10.

What has been described is a wiring harness which incorporates the system configuration within the wiring harness. By incorporating the configuration into the wiring harness, the present invention simplifies the design of the HVAC system controller. Whether starting up a new system, upgrading an existing system or repairing a problem system, field service and installation personnel need only plug the controller into the wiring harness in order to configure the system controller.

Additionally, the incorporation of the configuration into the wiring harness solves the previous problems resulting from human error in rewiring standard wiring harness and in configuring systems.

What has been described above is an invention which configures an HVAC system controller simply by plugging in a wiring harness. It should be recognized that modifications and alterations of the present invention as described herein are possible, and that all such modifications and alterations are intended to be within the spirit and scope of the present invention.

What is desired to be secured by Letters Patent of the United States is claimed as follows:

1. A method of configuring a controller of an HVAC system comprising the steps of:
   fixing the possible system configurations of an HVAC system into a permanent medium in each of a plurality of distinct configuration wiring harnesses;
   selecting a wiring harness representative of the configuration of a desired specific refrigeration system from the plurality of distinct configuration wiring harnesses;
   attaching the selected wiring harness to the controller of the specific refrigeration system; and
   accepting, in the controller, an input from the permanent medium in the selected wiring harness;
   configuring the controller of the HVAC system based upon components which are indicated by the input from the selected wiring harness to be physically connected to the HVAC system.

2. The method of claim 1 including the further steps of:
   reading a plurality of inputs which are permanently included in the wiring harness, and
   determining a value from said plurality of inputs.

3. The method of claim 2 including the further step of:
   using the value as an index into a lookup table, said lookup table forming a part of the controller and providing a specific system configuration for each value.

4. A self configuring controller and wiring harness for an HVAC system having various components including at least one compressor and at least one heat exchanger, said various components each including a first plurality of input/output terminals, the self configuring controller and wiring harness comprising:
   the controller including a second plurality of input terminals and a third plurality of input/output terminals; and
   the wiring harness adapted for connection to said controller and to the various components of the HVAC system, the wiring harness interconnecting the first and third plurality of input/output terminals, and the wiring harness also permanently including, operatively connected to the second plurality of input terminals, means for providing predetermined electrical connections between the second plurality of input terminals where the predetermined electrical connections represent an initial HVAC system configuration to the controller.

5. The self-configuring controller and wiring harness of claim 4, wherein the configuration providing means includes a plurality of permanent wires in the wiring harness, the plurality of permanent wires providing a binary input to the controller.

6. A controller and predetermined wiring harness for an HVAC system comprising:

the controller including a plurality of input terminals and means to control a plurality of possible components of an HVAC system; and the predetermined wiring harness linking the plurality of possible HVAC system components to each other and to the controller, said wiring harness permanently including means for fixing a selected system configuration chosen from one of a plurality of allowable system configurations into a permanent medium embedded in the wiring harness, and means for interconnecting the permanent medium representative of the selected system configuration to the controller's plurality of input terminals.

7. The system of claim 6, wherein the controller includes at least one look table, and the permanent medium includes a plurality of permanent wires in the wiring harness providing an input to the controller which the controller can use as an index into a lookup table.

8. A method for configurating the controller of an HVAC system comprising the steps of:

incorporating a plurality of potential HVAC system configurations into a permanent medium within a plurality of respective wiring harnesses;

selecting a predetermined wiring harness from said plurality of wiring harness which includes, in the permanent medium, a number of binary inputs indicative of a desired system configuration;

installing the wiring harness in an HVAC system in operative association with the controller; and configuring the controller to control the HVAC system in accordance with the binary inputs indicative of the desired system configuration.

9. An HVAC system comprising:

a compressor;

an outdoor heat exchanger connected to the outlet of the compressor;

an indoor heat exchanger connected to the inlet of the compressor;

an expansion device connected between the indoor and the outdoor heat exchangers;

a controller including a plurality of input terminals and means to control the operation of the HVAC system; and a wiring harness providing operable connections between said controller, the compressor, the indoor heat exchanger and the outdoor heat exchanger, said wiring harness also permanently including predetermined means for engaging said plurality of input terminals and means for providing a selective electrical connection between said input terminals which represents the possible system configuration, whereby the distinct pre-programmed wiring harness representative of the desired system is selected and engaged to said plurality of input terminals to configure the heating, ventilating and air conditioning system based upon the system configuration represented by the selective electrical connection.

10. The system of claim 9 wherein the configuring means includes a plurality of electrical connections which provide binary inputs to the controller.

11. A system for programming the controller of a heating, ventilating and air conditioning system so that the controller recognizes which elements of a multiplicity of possible elements are present in the system, comprising:

a controller for controlling a heating, ventilating and air conditioning system as well as the individual elements of the system, the controller including a plurality of input terminals; and, a plurality of distinct pre-programmed wiring harnesses, each distinct pre-programmed wiring harness permanently incorporating a possible system configuration, each of said plurality of wiring harnesses having means for engaging said plurality of input terminals and means for providing a selective electrical connection between said input terminals which represents the possible system configuration, whereby the distinct pre-programmed wiring harness representative of the desired system is selected and engaged to said plurality of pairs of input terminals to configure the heating, ventilating and air conditioning system.

12. A method of configuring the controller of a heating, ventilating and air conditioning system comprising the steps of:

determining the various allowable system configurations;

forming a plurality of distinct wiring harnesses representative of each of the various allowable system configurations;

fixing the possible system configurations into a permanent medium in each distinct configuration wiring harness;

determining the configuration of a specific refrigeration system;

selecting a wiring harness from the plurality of distinct wiring harnesses which is representative of the configuration of the specific refrigeration system; and, attaching the selected wiring harness to the controller of the specific refrigeration system.

13. The method of claim 12 including the step of permanently including the condenser fan continuous and cycling mode configuration inputs with the condenser fan cycling temperature input within the wiring harness of the HVAC system.

14. The method of claim 13 including the steps of predetermining at least a first combination of inputs indicative of the condenser fan continuous mode of operation, predetermining a plurality of second input combinations indicative of the condenser fan cycling mode of operation and providing an indication of a condenser fan cycling temperature in the second input combination.

15. A method of configuring the condenser fan continuous and cycling modes of operation and the condenser fan cycling temperature in an HVAC system, comprising the step of permanently including the condenser fan continuous and cycling mode configuration inputs with the condenser fan cycling temperature input within a wiring harness of an HVAC system.

16. The method of claim 15 including the further steps of predetermining at least a first combination of inputs indicative of the condenser fan continuous mode of operation, predetermining a plurality of second input combinations indicative of the condenser fan cycling mode of operation and providing an indication of a condenser fan cycling temperature in the second input combination.

* * * * *